(12) United States Patent
Saraf

(10) Patent No.: US 6,433,088 B1
(45) Date of Patent: Aug. 13, 2002

(54) CLEAR AND PRINTABLE POLYPROPYLENE FILMS

(75) Inventor: Anil W. Saraf, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 40 days.

(21) Appl. No.: 09/633,517

(22) Filed: Aug. 4, 2000

(51) Int. Cl.⁷ .................... C08L 23/00; C08L 23/04; C08L 33/04; C08L 35/02
(52) U.S. Cl. .................. 525/191; 525/221; 525/222; 525/224; 525/239; 525/240; 264/171.26; 264/209.1; 264/216; 101/483
(58) Field of Search ............... 525/191, 221, 525/222, 224, 239, 240; 264/171.26, 209.1, 216; 101/483

(56) References Cited

U.S. PATENT DOCUMENTS

| | | | | |
|---|---|---|---|---|
| 3,879,492 A | * | 4/1975 | Bontinick | 523/100 |
| 4,086,204 A | | 4/1978 | Cassandrini et al. | |
| 4,277,578 A | * | 7/1981 | Yoshimura et al. | 525/211 |
| 4,331,586 A | | 5/1982 | Hardy | 525/186 |
| 4,542,199 A | | 9/1985 | Kaminsky et al. | 526/160 |
| 4,732,786 A | | 3/1988 | Patterson et al. | 427/261 |
| 4,812,500 A | | 3/1989 | Hayden | 524/99 |
| 5,330,831 A | | 7/1994 | Knoerzer et al. | 428/353 |
| 5,496,635 A | | 3/1996 | Francis et al. | 428/352 |
| 5,496,636 A | | 3/1996 | Gu et al. | 428/352 |
| 5,539,124 A | | 7/1996 | Etherton et al. | 548/402 |
| 5,543,477 A | | 8/1996 | Latiolais et al. | 526/65 |
| 5,637,660 A | | 6/1997 | Nagy et al. | 526/160 |
| 5,756,611 A | | 5/1998 | Etherton et al. | 526/127 |
| 5,789,123 A | | 8/1998 | Cleckner et al. | 430/18 |
| 5,827,627 A | | 10/1998 | Cleckner et al. | 430/18 |
| 5,902,684 A | | 5/1999 | Bullard et al. | 428/515 |
| 6,034,027 A | | 3/2000 | Krishnamurti et al. | 502/200 |
| 6,306,520 B1 | * | 10/2001 | Nagata et al. | 428/520 |

* cited by examiner

*Primary Examiner*—Nathan M. Nutter
(74) *Attorney, Agent, or Firm*—Shao Guo

(57) ABSTRACT

A clear and printable polypropylene film is disclosed. The film is prepared from a blend of a polypropylene and an ethylene/alkyl acrylate copolymer. It has an excellent adhesion with commonly used inks without surface treatment.

16 Claims, No Drawings

CLEAR AND PRINTABLE POLYPROPYLENE FILMS

FIELD OF THE INVENTION

The invention relates to polypropylene films. In particular, the invention relates to polypropylene films that are clear and printable.

BACKGROUND OF THE INVENTION

Polypropylene films are not printable. This limits their utilities in the areas where printable surfaces are necessary. Methods to improve printability of polypropylene are known, for example, flame treatment, plasma treatment, chemical treatment and corona discharge treatment. These treatments can soften or ionize the surface of polypropylene and make the surface temporarily printable.

U.S. Pat. No. 5,330,831 teaches how to modify a polypropylene substrate by corona discharge treatment and then cover the treated surface with a coating. The coating is a printable polymer and, therefore, the coated polypropylene is printable. Similarly, U.S. Pat. Nos. 5,789,123, 5,496,635, 5,496,636, 4,732,786, 5,827,627, and 5,789,123 also teach polypropylene films that are coated with printable coatings.

Another method to make polypropylene substrates printable is to make multilayer films. For example, U.S. Pat. No. 5,902,684 teaches a printable multilayer film that consists of a polypropylene layer, a primer coating layer, a layer of crosslinked polyvinyl alcohol, and a layer of a blend of polyvinyl alcohol and an ethylene-acrylic acid copolymer. A printable outer layer makes the multilayer film printable. Polypropylene films with multilayers or coated with printable coatings, although printable, are difficult and expensive to make. Moreover, these modifications often impair the clarity of polypropylene films.

Printable polypropylene films are needed. Particularly, printable polypropylene films having excellent clarity are needed. We have surprisingly found that a printable and clear polypropylene film can be produced from a blend of polypropylene and an ethylene-alkyl acrylate copolymer. More importantly, the films can be conveniently and inexpensively produced.

SUMMARY OF THE INVENTION

The invention is a clear and printable polypropylene film. The film is prepared from a blend comprising a polypropylene and an ethylene/alkyl acrylate copolymer. The ethylene/alkyl acrylate copolymer has a molar ratio of ethylene to alkyl acrylate from about 1/1 to about 20/1. The polypropylene contains up to about 20 wt % of recurring units of ethylene or a $C_4$–$C_{10}$ α-olefin.

The invention also includes a clear and printable polypropylene film made from a blend comprising a polypropylene, an ethylene/alkyl acrylate copolymer and a third polymer. The third polymer is selected from polyester, acrylic resin, polyvinyl alcohol, polyvinyl chloride, polyvinyl acetate, polyvinyl ether, ethylene-vinyl acetate copolymer, ethylene-vinyl alcohol copolymer, ethylene-acrylic acid copolymer, and mixtures thereof.

The invention includes a method to prepare a clear and printable polypropylene film. The method includes blending a polypropylene, an ethylene/alkyl acrylate and, optionally, a third polymer, and then converting the blend into a film.

DETAILED DESCRIPTION OF THE INVENTION

The printable polypropylene film of the invention is made from a polymer blend. The polymer blend comprises from about 5 to about 55 wt % of an ethylene/alkyl acrylate copolymer. The ethylene/alkyl acrylate copolymer has a molar ratio of ethylene to alkyl acrylate within the range of about 1/1 to about 20/1. Preferably, the copolymer has a molar ratio of ethylene to alkyl acrylate within the range of about 5/1 to about 20/1. In general, the higher concentration of acrylate recurring units in the copolymer, the less copolymer is used in the blend.

Methods for preparing ethylene/alkyl acrylate copolymers are known. For example, U.S. Pat. No. 5,543,477, the teachings of which are herein incorporated by reference, teaches how to prepare ethylene/alkyl acrylate copolymer by free radical polymerization. Suitable ethylene/alkyl acrylates copolymers include copolymers of ethylene with a $C_1$ to $C_{20}$ alkyl acrylate or methacrylate. Examples are ethylene/methyl acrylate copolymers, ethylene/methyl methacrylate copolymers, ethylene/ethyl acrylate copolymers, ethylene/ethyl methacrylate copolymers, ethylene/butyl acrylate copolymers, ethylene/butyl methacrylate copolymers, and the like, and mixtures thereof. Ethylene/methyl acrylate copolymers and ethylene/butyl acrylate copolymers are preferred because of their low temperature flexibility. Ethylene/methyl acrylate copolymers are commercially available.

The polymer blend contains from about 45 to about 95 wt % of a polypropylene. Suitable polypropylene includes propylene homopolymers and random copolymers with ethylene or other α-olefins. Propylene homopolymers can be isotactic, syndiotactic, or atactic, or mixtures theirof. Isotactic polypropylene is preferred because its crystalline nature gives the printable film better solvent and heat resistance.

Suitable random copolymers include propylene-ethylene copolymers and propylene-$C_4$ to $C_{10}$ α-olefin copolymers. Examples of $C_4$ to $C_{10}$ α-olefins are 1-butene, 1-hexene and 1-octene. Compared to propylene homopolymers, random copolymers feature increased clarity and improved impact resistance. Preferred random copolymers are propylene-ethylene copolymers. More preferably, the propylene-ethylene copolymers contain about 1 to about 20 wt % recurring units of ethylene. Most preferably, the propylene-ethylene copolymers contain about 1 to about 10 wt % recurring units of ethylene.

Polypropylene can be produced with Ziegler catalysts or single-site catalysts. Single-site catalysts can be divided into metallocene and non-metallocene. Metallocene single-site catalysts are transition metal compounds that contain cyclopentadienyl (Cp) or Cp derivative ligands (see U.S. Pat. No. 4,542,199). Non-metallocene single-site catalysts are referred to as those that contain ligands other than Cp but have the same catalytic characteristics as the metallocene. The non-metallocene single-site catalysts usually contain heteroatomic ligands, e.g., boraaryl (see U.S. Pat. No. 6,034,027), pyrrolyl (see U.S. Pat. No. 5,539,124), azaborolinyl (see U.S. Pat. No. 5,756,611) and quinolinyl (see U.S. Pat. No. 5,637,660). Single-site catalysts give polyolefins narrow molecular distributions.

Number average molecular weight of polypropylene is preferably within the range of 100,000 to 1,000,000, more preferably from 200,000 to 600,000. Molecular weight distribution (MWD) is the ratio of weight average molecular weight over number average molecular weight. Molecular weight and molecular weight distribution can be measured by GPC. Suitable polypropylene for use in the invention preferably has a MWD within the range of 1 to 30, more preferably from 1 to 10 as measured by GPC. Molecular weight can also be measured by melt flow rate (MFR). The lower the molecular weight of polypropylene, the higher the MFR. MFR can be measured by ASTM, e.g., ASTM D-1238-89. Suitable polypropylene preferably have a MFR within the range of 0.1 to 100, more preferably from 0.5 to 50 and most preferably from 1 to 10.

Optionally, the polymer blend contains a third polymer. Adding a third polymer into the blend can either enhance the performance of the product or reduce the cost. However, addition of a third polymer shall not significantly affect the printability or the clarity of the polypropylene film. Suitable third polymers include polyester, acrylic resin, polyvinyl alcohol, polyvinyl chloride, polyvinyl acetate, polyvinyl ether, ethylene-vinyl acetate copolymers (EVA), ethylene-vinyl alcohol copolymers (EVOH), ethylene-acrylic acid copolymers, and the like, and mixtures thereof. EVA and EVOH are preferred because they are easy to blend.

Optionally, the polymer blend also contains anti-oxidants, UV-absorbents, flow agents, or other additives. The additives are well known in the art. For example, U.S. Pat. Nos. 4,086,204, 4,331,586 and 4,812,500, the teachings of which are herein incorporated by reference, teach the UV stabilizers for polyolefins. Addition of the additives must not impair the printability or the clarity of the film of the invention.

Polypropylene films are not printable. The polypropylene films of the invention are rendered printable by uniformly blending a polypropylene with an ethylene/alkyl acrylate copolymer. Any suitable blending techniques can be used. The polymers can be blended in solution, in thermal processing such as extrusion, or in the polymerization reactor in-situ. By "in-situ," we mean that adding a pre-prepared first polymer (e.g., an ethylene/alkyl acrylate copolymer) into the polymerization unit in which a second polymer (e.g., a propylene polymer) is made.

The polypropylene films of the invention can be prepared from the polymer blend by casting, press molding, blowing film extrusion, and many other suitable techniques. Blowing film extrusion is the preferred technique for a large commercial production. One advantage of the invention is that the film can be made in an existing instrument that is used to make ordinary polypropylene films.

The polypropylene film of the invention is clear and printable. By "printable," we mean that the film is printable without any surface treatment, although surface treatments, e.g., flame treatment, plasma treatment, chemical treatment and corona discharge treatment, may be employed to increase its performance.

The film has an excellent adhesion with commonly used printing inks. One advantage of the polypropylene film of the invention is that it is printable with both UV curable inks and waterborne inks. These ink systems have a minimum amount of VOC (volatile organic compound) solvents and therefore are environmentally safer.

The printed film has many applications. For example, it can be used for labels, documents, and advertisements. Because the film has an excellent clarity, it is particularly useful as labels for clear bottles, boxes, or other packages where goods inside the packages can be clearly seen without opening the packages.

The following examples merely illustrate the invention. Those skilled in the art will recognize many variations that are within the spirit of the invention and scope of the claims.

EXAMPLE 1

Ninety parts of propylene-ethylene random copolymer containing 3 wt % of ethylene recurring units and having a MFR (melt flow rate, ASTM D-1238-89) of 4 is mixed with 10 parts of ethylene-methyl acrylate copolymer (EMA) containing 24 wt % of methyl acrylate recurring units. The mixture is thermally blended in a 40 mm Berstorff extruder at 250° C. The polymer blend is then blowing molded into a thin film. The film has a haze of 17. A waterborne ink is applied onto the film. After 3 minutes of drying in an oven at 50° C., the film is tested for adhesion. The film is printable and clear.

EXAMPLE 2

The procedure of Example 1 is repeated, but 45 parts of EMA and 55 parts of the random copolymer are blended. The film made from the blend is printable and clear.

EXAMPLES 3–6

The procedure of Example 1 is repeated with various ratio of EMA to propylene homopolymer. Ten parts of EVA (ethylene-vinyl acetate copolymer having 18 wt % of vinyl acetate units) is added to the blend of each example. The films all show good adhesion with the printing ink and have low haze.

EXAMPLE 7–9

The procedure of Example 1 is repeated with a variety of EMA/polypropylene ratio by using an EMA having 29 wt % of recurring units of methyl acrylate. The films made from the blends are printable and clear.

COMPARATIVE EXAMPLE 10

The procedure of Example 1 is repeated with only polypropylene. The film is clear but not printable.

COMPARATIVE EXAMPLES 11–12

The procedure of Example 1 is repeated. The random copolymer used in Example 1 is blended with polyvinyl alcohol (PVA). The printed films failed in the tape adhesion test.

COMPARATIVE EXAMPLE 13

The procedure of Example 1 is repeated. The random copolymer used in Example 1 is blended with an ethylene/n-butyl acrylate/maleic anhydride terpolymer (Loater® AX8900, product of Elf Atochem). The printed film failed in the tape adhesion test.

COMPARATIVE EXAMPLE 14

The procedure of Example 1 is repeated. The random copolymer used in Example 1is blended with an ethylene/n-butyl acrylate/maleic anhydride terpolymer (Loater® 3410, product of Elf Atochem). The printed film failed in the tape adhesion test.

TABLE 1

| Ex. No. | Polymer Blend | Tape Adhesion*** | Haze |
|---|---|---|---|
| 1 | 10 parts EMA*; 90 parts propylene homopolymer | Pass | 17 |
| 2 | 45 parts EMA*; 55 parts propylene homopolymer | Pass | 20 |
| 3 | 15 parts EMA*; 75 parts propylene homopolymer; 10 parts EVA | Pass | 25 |

TABLE 1-continued

| Ex. No. | Polymer Blend | Tape Adhesion*** | Haze |
|---|---|---|---|
| 4 | 25 parts EMA*; 65 parts propylene homopolymer; 10 parts EVA | Pass | 32 |
| 5 | 35 parts EMA*; 55 parts propylene homopolymer; 10 parts EVA | Pass | 14 |
| 6 | 45 parts EMA*; 45 parts propylene homopolymer; 10 parts EVA | Pass | 35 |
| 7 | 15 parts EMA**; 85 parts propylene homopolymer | — | 17 |
| 8 | 25 parts EMA**; 75 parts propylene homopolymer | — | 30 |
| 9 | 35 parts EMA**; 65 parts propylene homopolymer; | Pass | 26 |
| C10 | Ethylene-propylene random copolymer | Fail | 4.2 |
| C11 | 10 parts PVA; 90 parts ethylene-propylene random copolymer | Fail | 12 |
| C12 | 10 parts PVA; 90 parts propylene homopolymer | Fail | 51 |
| C13 | 10 parts Lotader AXB900, 90 parts ethylene-propylene random copolymer | Fail | 7.3 |
| C14 | 10 parts Lotader 3410; 90 parts propylene-ethylene random copolymer | Fail | 5.8 |

*Ethylene-methyl acrylate copolymer that has 24 wt % recurring units of methyl acrylate.
**Ethylene-methyl acrylate copolymer that has 29 wt % recurring units of methyl acrylate.
***ASTM 3359

We claim:

1. A clear and printable film composition that consists essentially of a blend of:
   (a) from about 5 to about 55 wt % of an ethylene/alkyl acrylate copolymer having a molar ratio of ethylene to alkyl acrylate within the range of about 1/1 to about 20/1; and
   (b) from about 45 to about 95 wt % of a polypropylene that contains up to about 20 wt % of recurring units of ethylene or a $C_4$ to $C_{10}$ α-olefin.

2. The composition of claim 1 wherein the ethylene/alkyl acrylate copolymer is selected from the group consisting of ethylene/methyl acrylate copolymer, ethylene/ethyl acrylate copolymer, ethylene/butyl acrylate copolymer, ethylene/methyl methacrylate copolymer, ethylene/butyl methacrylate copolymer, and mixtures thereof.

3. The composition of claim 1 wherein the ethylene/alkyl acrylate copolymer is ethylene/methyl acrylate copolymer.

4. The composition of claim 1 wherein the ethylene/alkyl acrylate copolymer having a molar ratio of ethylene to alkyl acrylate within the range of about 5/1 to about 20/1.

5. The composition of claim 1 wherein the polypropylene contains up to about 10 wt % of recurring units of ethylene or a $C_4$ to $C_{10}$ α-olefin.

6. A method for preparing a printable and clear film consisting essentially of:
   (a) blending
      (i) from about 5 to about 55 wt % of an ethylene/alkyl acrylate copolymer having a molar ratio of ethylene to alkyl acrylate within the range of about 1/1 to about 20/1;
      (ii) from about 45 to about 95 wt % of a polypropylene that contains up to about 20 wt % of recurring units of ethylene or a $C_4$ to $C_{10}$ α-olefin; and
   (b) converting the product of (a) into a film.

7. The method of claim 6 wherein the ethylene/alkyl acrylate copolymer is selected from the group consisting of ethylene/methyl acrylate copolymer, ethylene/ethyl acrylate copolymer, ethylene/butyl acrylate copolymer, ethylene/methyl methacrylate copolymer, ethylene/butyl methacrylate copolymer, and mixtures thereof.

8. The method of claim 6 wherein the ethylene/alkyl acrylate copolymer is ethylene/methyl acrylate copolymer.

9. The method of claim 6 wherein the ethylene/alkyl acrylate copolymer having a molar ratio of ethylene to alkyl acrylate within the range of about 5/1 to about 20/1.

10. The method of claim 6 wherein the polypropylene contains up to about 10 wt % of recurring units of ethylene or a $C_4$ to $C_{10}$ α-olefin.

11. A method for printing on a film consisting essentially of:
   (a) blending
      (i) from about 5 to about 55 wt % of an ethylene/alkyl acrylate copolymer having a molar ratio of ethylene to alkyl acrylate within the range of about 1/1 to about 20/1;
      (ii) from about 45 to about 95 wt % of a polypropylene that contains up to about 20 wt % of recurring units of ethylene or a $C_4$ to $C_{10}$ α-olefin;
   (b) converting the blend into a film; and
   (c) printing on the film.

12. The method of claim 11 wherein the ethylene/alkyl acrylate copolymer is selected from the group consisting of ethylene/methyl acrylate copolymer, ethylene/ethyl acrylate copolymer, ethylene/butyl acrylate copolymer, ethylene/methyl methacrylate copolymer, ethylene/butyl methacrylate copolymer, and mixtures thereof.

13. The method of claim 11 wherein the ethylene/alkyl acrylate copolymer is ethylene/methyl acrylate copolymer.

14. The method of claim 11 wherein the ethylene/alkyl acrylate copolymer having a molar ratio of ethylene to alkyl acrylate within the range of about 5/1 to about 20/1.

15. The method of claim 11 wherein the polypropylene contains up to about 10 wt % of recurring units of ethylene or a $C_4$ to $C_{10}$ α-olefin.

16. A printed film produced by the method of claim 11.

* * * * *

UNITED STATES PATENT AND TRADEMARK OFFICE
CERTIFICATE OF CORRECTION

PATENT NO. : 6,433,088 B1
DATED : August 13, 2002
INVENTOR(S) : Anil W. Saraf et al.

It is certified that error appears in the above-identified patent and that said Letters Patent is hereby corrected as shown below:

<u>Title page,</u>
Item [75], the Inventors should read as follows:

-- Anil W. Saraf, Mason, OH (US)
Thomas M. Herman, Destrehan, LA (US)
Richard F. Tate, Webster, TX (US) --

Signed and Sealed this

Fifteenth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,433,088 B1
DATED : August 13, 2002
INVENTOR(S) : Anil W. Saraf et al.

It is certified that error appears in the above-identified patent and that said Letters Patent is hereby corrected as shown below:

<u>Title page,</u>
Item [75], the Inventors should read as follows:

-- Anil W. Saraf, Mason, OH (US)
  Thomas M. Herman, Destrehan, LA (US)
  Richard F. Tate, Webster, TX (US) --

Signed and Sealed this

Twenty-second Day of April, 2003

JAMES E. ROGAN
*Director of the United States Patent and Trademark Office*